(12) United States Patent
Bejjani et al.

(10) Patent No.: US 6,510,143 B1
(45) Date of Patent: Jan. 21, 2003

(54) ADAPTIVE PATH SEARCHER IN A CDMA RECEIVER

(75) Inventors: Elie Bejjani, Saint-Cloud (FR); Jean-François Bouquier, Madrid (ES); Benoît de Cacqueray, Paris (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/366,317

(22) Filed: Aug. 2, 1999

(30) Foreign Application Priority Data

Jul. 1, 1999 (EP) .............................. 99401633

(51) Int. Cl.⁷ .............................................. H04B 1/707
(52) U.S. Cl. ........................ 370/320; 370/335; 370/342; 375/148; 375/150; 375/227
(58) Field of Search ................................. 370/320, 335, 370/342, 441; 375/145, 147, 148, 149, 150, 227, 349

(56) References Cited

U.S. PATENT DOCUMENTS 5,719,899 A * 2/1998 Thielecke et al. .......... 370/320
5,818,866 A * 10/1998 Wilk .......................... 375/349
6,026,115 A * 2/2000 Higashi et al. ............. 370/335
6,229,842 B1 * 5/2001 Schulist et al. ............. 375/148

FOREIGN PATENT DOCUMENTS

EP        0 756 391 A1    1/1997

OTHER PUBLICATIONS

Fukumoto, S. et al.: "Matched Filter–Based Rake Combiner for Wideband DS–CDMA Mobile Radio" IEICE Transactions on Communications, vol. E81–B, No. 7, Jul. 1, 1998, pp. 1384–1390, XP000790171 ISSN:—0916–8516.

* cited by examiner

Primary Examiner—Wellington Chin
Assistant Examiner—Frank Duong
(74) Attorney, Agent, or Firm—Sughrue Mion, PLLC

(57) ABSTRACT

Path selection method in a CDMA receiver for the selection of the true path of a transmission channel, comprising the step of comparing the profile energy with a threshold, characterized in that the threshold is dynamically determined as a function of the mean of noise and interference paths derived from the transmission channel profile estimation.

6 Claims, 1 Drawing Sheet

Profile (80 samples represent one power profile)

ADAPTIVE PATH SEARCHER IN A CDMA RECEIVER

BACKGROUND OF THE INVENTION

In a mobile radio system, the emitted signal can follow different paths to reach the receiver, due to reflections by obstacles. This phenomenon creates a multipath channel and interference among a large number of multipaths with different time delays. The received signal can therefore be selectively faded for some frequencies.

Within a Code Division Multiple Access (CDMA) receiver, the selection of the relevant paths/delays of the transmission channel is needed in order to perform the channel estimation and data detection in presence of noise and interference the RAKE receiver has to combine coherently the different estimated paths of the channel. Due to noise, interference and Doppler spread, some paths can be selected which do not exist in the real Channel Impulse Response (CIR). The receiver must therefore select the true channel paths of the transmission channel among all the detected samples in a profile, in order to perform the channel estimation.

The RAKE receiver comprises a path searcher that can estimate, from a known pilot sequence, the number and locations (ie the time delays) of the paths in a frequency selective channel. These delay estimates are then used by a channel estimator to get the complex coefficients of the propagation channel and the channel impulse response over all the detected paths. Finally the combiner coherently combines the channel coefficient estimates obtained for each path to enhance the useful data signal before detection.

The invention is related to the path searcher of the RAKE receiver.

To detect paths, the path searcher uses the pilot sequence of the Dedicated Physical Channel (DPC) or any other channel. The path searcher needs a power profile prior to the path selection operation. Such a profile is preferably computed by non-coherent averaging of instantaneous channel profiles performed on a slot by slot basis. Each instantaneous profile consists in performing a series of correlation. In a CDMA system, part of the signal (called pilot sequence) is known by the receiver. At the receiver, the spread pilot sequence is generated. Correlating this signal with the received one allows estimating the energy of the paths. As the channel can be spread over a certain duration, the path searcher performs the correlation over a predetermined time window. It yields peak of energy for each path of the channel and false samples related to the noise and interference levels for other time delays. This set of values is called a profile. Then, the path searcher performs a summation of the instantaneous profiles. Such a summation allows detecting the true paths of the channel by averaging the spurious noise. The following task of the path searcher is then the thresholding of the probably spurious paths, according to predetermined rules.

From this profile, the path searcher must find the paths corresponding to the transmission channel that corresponds to the information that was originally emitted.

It is known to compute different thresholds in order to determine the good paths with low error probability. This thresholding of the detected paths is obtained by comparison of their energy with the energy of the total CIR or by the comparison with the most important path.

In general, no attempt is made to model the interference or estimate its power. A unique threshold variable is derived in order to be compared with the overall instantaneous power of the channel taps.

Usual path selection algorithms generally select a number of most powerful samples that are above a predefined fixed threshold. If the fixed threshold is too low, there is a non-negligible probability of erroneously selecting a large number of only noise samples in the profile. On the contrary, if the fixed threshold is too high, some of the channel taps with the lower power are not selected and thus a waste of energy and/or diversity is incurred.

In EP0643504 an improvement of the usual method is disclosed. A decision variable is computed and compared to a fixed quality threshold. It gives a method to compute a decision variable that is the ratio of the estimated signal power and the overall received signal consisting of the signal emitted added to the interference power. This ratio is used as a decision variable allowing the selection of the paths. In addition, in order to estimate the reliability of this decision variable, a reference threshold is computed by using the minimum Signal-To-Noise ratio (SIRmin) required by the system.

No attempt is made to explicitly estimate the interference power level. It doesn't take into account the noise and the interference level, which is a crucial problem in CDMA systems. The estimated power is obtained by adding the energy of all the potential channel taps lying within an interval of K samples. It is therefore assumed that the exact window containing the channel impulse response is already known, but there is no method proposed to precisely track this window. Moreover, no attempt is made to distinguish the samples where effective channel taps exist from those of only noise among the K considered samples of the window. For low SIRs, the estimated threshold quality decreases rapidly; in the taps selection, it is necessary to compute a predetermined set of thresholds by simulation, which cannot be considered as an adaptive algorithm.

In "Matched Filter-Based RAKE Combiner for Wideband DS-CDMA Mobile Radio", IEICE Trans. Commun. Vol.E81-B, No. 7 July 1998 (Satoru Fukumoto—Mamoru Sawahashi—Fumiyuki Adachi), a threshold depending on the lowest noise level is proposed. Instead of only considering the most important sample and deriving directly a threshold, it also considers the less important sample and derives a second threshold from it. The maximum of the two threshold is used to decide if a path must be selected. This method does not take into account the whole profile and its properties. If the signal does not contain paths that are important enough, this method can consider them as noise and find a poor quality signal.

SUMMARY OF THE INVENTION

The invention gives a new method for finding the paths corresponding to the transmission channels, which determine dynamically a reliable adaptive threshold based on the noise and the interference level.

The goal of the invention is to select reliably the channel taps using a large power profile (large time observation window or large number of samples) with possible non-coherent averaging in time.

The invention consists in a path selection method in a CDMA receiver for the selection of the true paths of a transmission channel, comprising the step of comparing the transmission channel energy with a threshold. The threshold is dynamically determined as a function of the mean of noise and interference samples derived from the transmission channel profile.

The noise and interference paths can be derived from the transmission channel profile by suppressing at least one of the most important estimated paths. These most important paths will represent about the tenth of the samples.

BRIEF DESCRIPTION OF THE DRAWINGS

The invention will be more clearly understood with reference to the accompanying drawings, wherein the single FIGURE illustrates several estimated power profiles and an adaptive threshold in accordance with the invention.

DETAILED DESCRIPTION OF THE INVENTION

Figure 1:
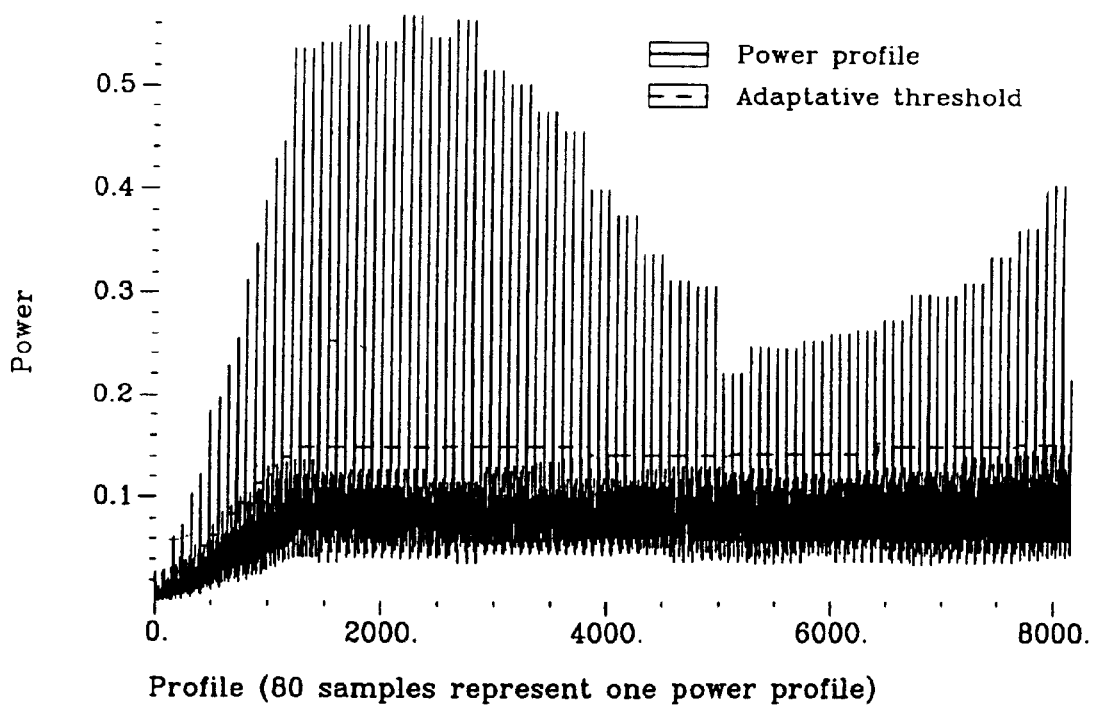

The preferred use for the invention is mobile phones.

In an embodiment, the election of the channel taps is based on a statistical modeling and characterization of the only noise samples of the profile. A tap selection threshold is then derived, to be compared with the average power of each candidate channel tap.

The threshold value is computed as a function of the average interference level directly derived from the profile itself. The statistical distribution of the noise samples is approximately modeled by a centered chi-squared variable. The distribution function of this variable is estimated by using the observed noise samples of the profile. Finally, the dynamic threshold is set such that the probability of a noise sample exceeding it is very low. The method is robust for all values of SIRs.

A rigorous statistical study on the power profile shows that an appropriate value for this threshold can be obtained from the mean of $z_d$ where $z_d$ is the $d^{th}$ power value in the profile. We assume that the receiver can handle up to LMAX paths. Therefore we should design an algorithm capable of discriminating as good as possible the peaks of the profile where a channel tap exists from those where there is only noise.

First we start by finding the LMAX most energetic peaks in the profile. Then the selection algorithm should be able to retain only LUSED peaks (LUSED ranges from 1 to LMAX) suspected with a high reliability to be a channel tap.

If the size of the window (WINDOW_SIZE) is large enough, the values computed by the path searcher provide a statistically sufficient set of independent realizations of the variable $z_d$. The $T_c$ spacing corresponding to time delays in the profile ensures the independence.

It can be shown that for each d for which no path corresponds, $Y_d$ value is a variable of a white Gaussian noise of mean 0 and variance depending on the pilot sequence. But if d corresponds to a path of the channel, $Y_d$ value is linked with the energy of the corresponding top. So this value cannot be used to evaluate the statistics of the noise.

The implemented algorithm consists of computing the WINDOW_SIZE values of the profile. For simplicity, we suppose that the number of significant paths in the channel is not greater than LMAX. So when estimating the noise level in the profile, we do not consider the LMAX greatest values.

Under this assumption, we know that the so constituted set of values $z_d$ can be modeled by the realization of Chi-Square random variable with 2*AVG_LENGTH degrees of freedom.

We then compute the mean and the variance of the $z_d$ variable. For this purpose, let's consider the set of values $z_d$, with d=1, ..., WINDOW_SIZE. Each $z_d$ value is the sum of 2*AVG_LENGTH statistically independent and identically distributed variables. By using the central limit theorem, each $z_d$ variable can be approached as a Gaussian distributed random variable (if AVG_LENGTH is large enough).

Within the Path Searcher, the threshold $\eta$ can be expressed in function of the mean m the deviation $\sigma$ and parameter $\alpha$ as follows:

$$\eta = m_{z_d} + \alpha \cdot \sigma_{z_d}$$

Finally, a comparison of the LMAX most energetic peaks to the threshold allows to find the LUSED true paths. Then, the position of the LUSED paths is transmitted to the channel estimator, to estimate the impulse response of each path, and to the combiner to combine coherently these detected paths.

FIG. 1 shows several estimated power profiles and the adaptive threshold. We can see that the adaptive threshold follows the interference floor in a way to discriminate true paths of the propagation channel. In this simulation, estimation of path delays is done every frame after an averaging of 16 instantaneous power profiles (AVG_LENGTH=16). In this example, 80 samples represent one power profile. These many samples show how the threshold is dynamically adapted for each sample.

The profiles can be used to estimate the noise. The maximum energy values, which probably correspond to a path of the channel, are stored in a separate memory and suppressed in the profile. The expected value m of the values of the profile is proportional to the noise level. The variance $\sigma^2$ of the profile is also computed. A threshold $\eta$ used by the receiver to decide if a value of the profile is a path is then computed: $\eta = m + \alpha \cdot \sigma$. This threshold is adapted for each slot and its value is computed so as to eliminate the path in close relation to the noise level.

Depending on the choice of the value of $\alpha$, e.g. $\alpha \geq 3$, such a threshold can suppress more than 99% of the spurious paths. The choice of this value of $\alpha$ is totally independent from the profile and has a statistical meaning. Thus, if the time window is large enough, the threshold does not depend any more from values of some particular paths that have a statistically meaningless behavior.

In order to ensure that at least one path is chosen, the most energetic path is always kept, even if its energy level is not in the range define by the threshold. This can happen if the profile does not contain distinctive paths.

The scope of the invention is not limited to this particular application and comprises all telecommunication systems where the search for true paths is relevant.

What is claimed is:

1. A path selection method in a CDMA receiver for selecting a true path of a transmission channel, comprising the step of:

comparing a profile energy with a threshold, characterized in that the threshold is dynamically determined as a function of a mean of noise paths and interference paths derived from an estimation of a transmission channel profile, wherein a path that has a highest energy and does not exceed said threshold can be selected as said true path.

2. The path selection method in a CDMA receiver according to claim 1, characterized in that a level of the noise and interference paths is derived from the transmission channel profile by suppressing at least one of the most important estimated paths.

3. The path selection method in a CDMA receiver according to claim 1, characterized in that a noise and interference level is derived from the transmission channel profile by suppressing the most important tenth paths of the estimated paths.

4. The path selection method in a CDMA receiver according to claim 1, characterized in that the threshold $\eta$ is given by $\eta=m+\alpha\sigma$ where m is the mean of the noise paths, $\sigma^2$ is the variance of the noise paths and $\alpha$ is a variable decision.

5. The path selection method in a CDMA receiver according to claim 4, characterized in that $\sigma$ is at least equal to 3.

6. The method of claim 1, wherein said comparing is performed in a mobile phone comprising a CDMA receiver.

* * * * *